(12) United States Patent
Prakash

(10) Patent No.: US 11,550,534 B2
(45) Date of Patent: Jan. 10, 2023

(54) COMPUTERIZED SYSTEM AND METHOD FOR GENERATING AND DYNAMICALLY UPDATING A DASHBOARD OF MULTIPLE PROCESSES AND OPERATIONS ACROSS PLATFORMS

(71) Applicant: AVEVA Software, LLC, Lake Forest, CA (US)

(72) Inventor: Ravi Kumar Herunde Prakash, Lake Forest, CA (US)

(73) Assignee: AVEVA SOFTWARE, LLC, Lake Forest, CA (US)

( * ) Notice: Subject to any disclaimer, the term of this patent is extended or adjusted under 35 U.S.C. 154(b) by 52 days.

(21) Appl. No.: 17/095,166

(22) Filed: Nov. 11, 2020

(65) Prior Publication Data

US 2021/0141585 A1 May 13, 2021

Related U.S. Application Data

(60) Provisional application No. 62/933,759, filed on Nov. 11, 2019.

(51) Int. Cl.
*G06F 9/451* (2018.01)
*G06F 3/14* (2006.01)
(Continued)

(52) U.S. Cl.
CPC .............. *G06F 3/1454* (2013.01); *G06F 8/41* (2013.01); *G06F 9/451* (2018.02); *G06F 16/22* (2019.01); *G06F 40/186* (2020.01)

(58) Field of Classification Search
CPC ........ G06F 3/1454; G06F 9/451; G06F 16/22; G06F 8/41
See application file for complete search history.

(56) References Cited

U.S. PATENT DOCUMENTS 11,099,864 B2 * 8/2021 Koziolek ................ G06F 3/147
2015/0378579 A1 * 12/2015 Kaplinger ............ H04L 67/303
715/745
(Continued)

FOREIGN PATENT DOCUMENTS

WO 2017074333 A1 5/2017

OTHER PUBLICATIONS

International Search Report and Written Opinion for PCT International Application No. PCT/US2020/05995, dated Feb. 23, 2021, 10 pages.

*Primary Examiner* — Haoshian Shih
(74) *Attorney, Agent, or Firm* — Greenberg Traurig, LLC

(57) ABSTRACT

Disclosed are systems and methods for improving interactions with and between computers in content providing, searching and/or hosting systems supported by or configured with devices, servers and/or platforms. The disclosed systems and methods provide a novel framework that automatically generates and dynamically updates a multi-displayed dashboard of consistent instances on separate devices and/or network locations. The disclosed framework produces and displays an interactive dashboard including electronic tiles representing data of multiple processes and operations. The framework includes functionality for uniformly maintaining the display characteristics, such as the look and feel of the dashboard and the tiles included therein, across platforms of different devices, operating environments and/or display capabilities.

19 Claims, 8 Drawing Sheets

(51) Int. Cl.
    *G06F 40/186*    (2020.01)
    *G06F 8/41*      (2018.01)
    *G06F 16/22*     (2019.01)

(56) References Cited

U.S. PATENT DOCUMENTS

| | | |
|---|---|---|
| 2016/0085430 A1* | 3/2016 | Moran .............. H04M 1/72454 715/765 |
| 2016/0132551 A1 | 5/2016 | Trinon et al. |
| 2017/0214764 A1 | 7/2017 | Bakshi et al. |
| 2017/0272331 A1 | 9/2017 | Lissack |
| 2018/0349446 A1* | 12/2018 | Triolo .................. G06F 16/252 |
| 2019/0087069 A1 | 3/2019 | McCauley |
| 2019/0324825 A1* | 10/2019 | Schwartz ............ G06F 3/04842 |

* cited by examiner

FIG. 5
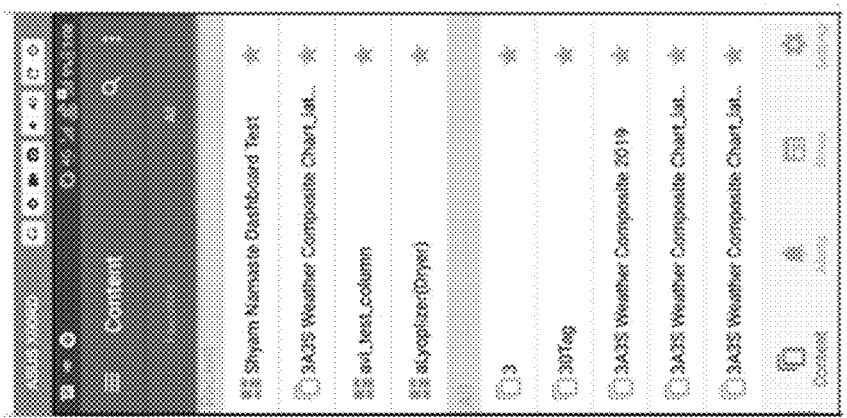
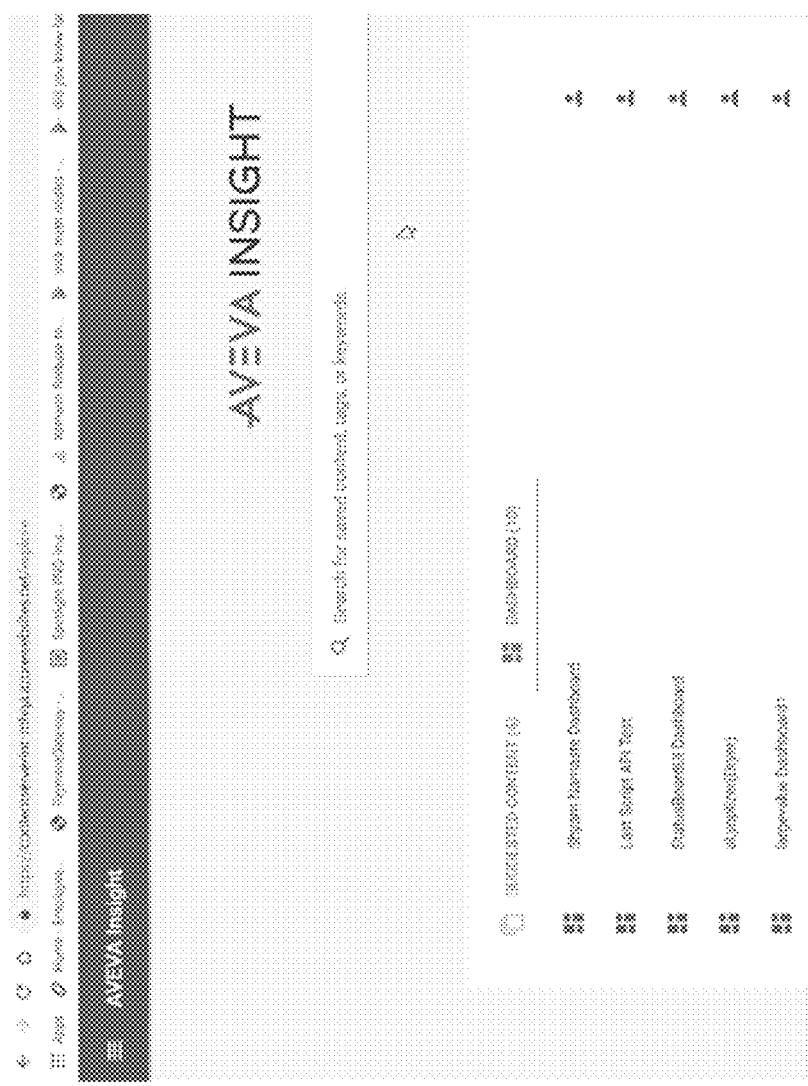

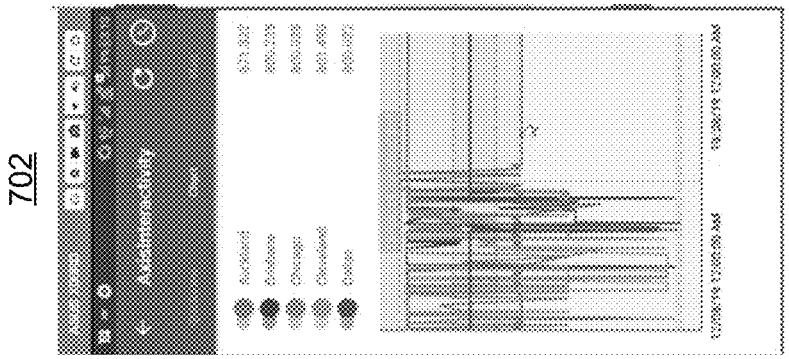
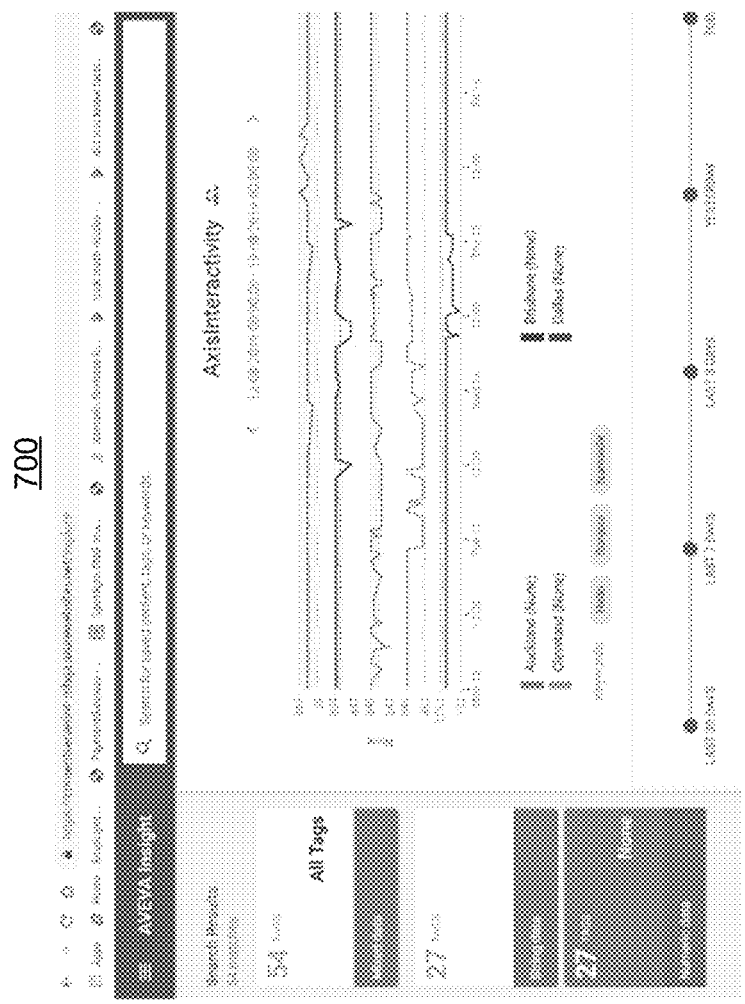
FIG. 7

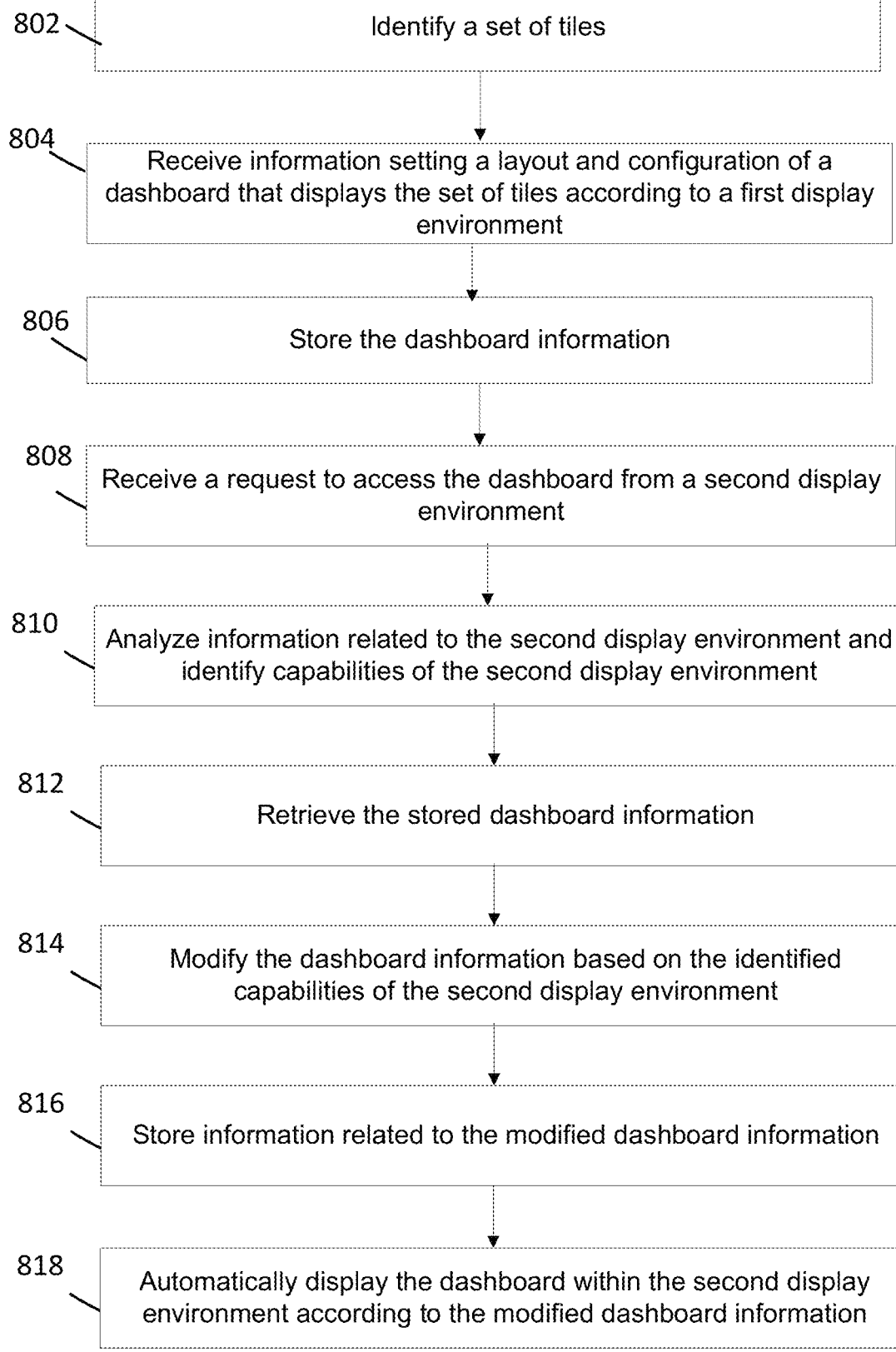

COMPUTERIZED SYSTEM AND METHOD FOR GENERATING AND DYNAMICALLY UPDATING A DASHBOARD OF MULTIPLE PROCESSES AND OPERATIONS ACROSS PLATFORMS

CROSS-REFERENCE TO RELATED APPLICATIONS

This application claims the benefit of priority from U.S. Provisional Application No. 62/933,759, filed Nov. 11, 2019, entitled "Dashboard Of Multiple Process And Operations Information Tiles In A Mobile App Server And System," which is incorporated herein by reference in its entirety.

This application includes material that is subject to copyright protection. The copyright owner has no objection to the facsimile reproduction by anyone of the patent disclosure, as it appears in the Patent and Trademark Office files or records, but otherwise reserves all copyright rights whatsoever.

FIELD

Some embodiments relate generally to improving the performance of network-based computerized content hosting and providing devices, systems and/or platforms by modifying the capabilities and providing non-native functionality to such devices, systems and/or platforms through a novel and improved asset management and visualization framework for automatically generating and dynamically updating a dashboard that provides data related to multiple processes and operations across platforms of different devices, operating environments and/or display capabilities, or some combination thereof.

BACKGROUND

As more data get logged into databases, cloud servers, operational historians and/or any other type of software-based and hardware supported local and/or network configured data store(s), customers, and the systems and services associated therewith, are looking for computerized mechanisms for managing, understanding and displaying the data.

Conventional mechanisms are failing, as they are leading to loss of data, increased bottlenecking and inefficiency in data reception and presentation, and an overall lack of organization in the way the data is protected, provided and displayed to users.

Moreover, different types of content such as text, audio, video or combinations thereof are provided to the users via, for example, their personal computing devices, smart phones, tablets, smart phones, and the like. These different types of devices host or implement different types of platforms via different hardware configurations that provide entirely different operating environments and/or display capabilities. This in turn has resulted in the development of various proprietary and platform-agnostic content formats.

SUMMARY

Thus, the existing technological failings in the computerized fields of data storage, retention and presentation are currently lacking online or computerized mechanisms that enable automatic, dynamically determined and updated interactions to facilitate how and which manner the data is compiled, presented and/or interacted with. Some embodiments of the disclosed systems and methods, among other features, provide the disclosed asset management and visualization framework to address these needs and more.

According to some embodiments, the disclosed framework executes systems and methods that automatically generate and dynamically update an interactive dashboard interface that comprises digital information related to multiple processes and operations. In some embodiments, the dashboard enables a uniform look and feel across platforms, devices and/or services being utilized to view and/or interact with the dashboard and/or interface objects (e.g., tiles) included therein.

In some embodiments, users compose a dashboard which is a collection of information tiles. The tiles, for example, can detail process data trends, status charts, and the like. The tiles provide an overview of assets' operations at a location, within an infrastructure of a web page or other desired environment.

In some embodiments, this collection of tiles is typically related to a single logical entity such as an asset or a facility and is organized, in some embodiments, to progressively disclose more information from left to right and top to bottom within the dashboard. In some embodiments, once the dashboard is configured, when a user logs into the network resource, they are able to view the previously configured (e.g., authored or customized) dashboard in a mobile friendly format and layout. The enables users to author their dashboards once but view them in a web-enabled device and/or a mobile device as desired.

This functionality makes all the information available in the dashboard available for users on the go, without needing to author a dashboard for mobile use. Further, in some embodiments, any changes done to the dashboard in the web or other environment are automatically reflected in the mobile. The dashboard in mobiles also allows for drill through into each of the information tiles for more details and interactions.

According to some embodiments, reference to a network resource can include, but is not limited to, a mobile application ("App", used interchangeably), a web hosted page accessible via a browser, an item stored within a cloud environment, or a locally stored item that is accessible directly from a user's device or via a network or other type (e.g., near field connection (NFC) connection), and the like.

In some embodiments, the dashboard can comprise a user (e.g., an author) processing only a predetermined number of times (e.g., once, for example)—that is, configuring the dashboard once, for example, and having this configuration dictate how other instances of the dashboard are depicted. Some embodiments provide access anywhere in a mobile App. In some embodiments, multiple process information tiles can provide a quick overview of an entire manufacturing process, operational facility or other operation or facility of interest.

In some embodiments, the layout of information tiles in the dashboard in the mobile App can be automatically adapted to the screen size, resolution and orientation, among other features as discussed below. In some embodiments, changes to the configuration of the dashboard in the web environment can be automatically reflected in the mobile device. In some embodiments, the deployment and/or presentation of the latest version of a dashboard can be accelerated, provided to or automatically matriculated to all users, serving as a very easy to use collaboration and communication mechanism. Such deployment can be based on administrator input, or server or device input, based on altered or newly detected capability information or tile information.

For example, an administrator can change the configuration tile of status chart every morning to reflect the most overheating pump or other asset with behavior or characteristics of interest from the previous day, so all users automatically view it for their analyses. Some embodiments enable the administrator to disseminate information to users in administrator-selected groups.

Some embodiments include tiles in the dashboard. In some embodiments, the dashboard can be found in a mobile App. In some embodiments, the tiles in dashboards can be automatically updated on a periodic or substantially continuous basis. In some embodiments, the combination of these features can create an author once functionality. In some embodiments, author once can have access in multiple formats. Some embodiments include easy to use multiple formats, collaborative, automatic updates in dashboards in a mobile device for mobile users. Some embodiments include quick, useful and actionable overview of their entire operation or facility of interest.

In some embodiments, a list of dashboards can be authored in a desktop and/or mobile (or tablet, used interchangeably)-based web environment. In some embodiments, the dashboards can be readily visible on a mobile device for users without the need to expend any extra effort. In some embodiments, the dashboards can be automatically adopted to the mobile screen format. Some embodiments comprise efficient engineering that can enable author-once-access anywhere plant process information dashboard for users.

Thus, as discussed herein, according to some embodiments, the disclosed systems and methods provide a platform-independent application framework that enables a platform-neutral dashboard environment that maintains a similar look and feel of the data across platforms, interfaces and applications. Therefore, for example, how a dashboard is displayed, and the mechanisms in which the data included therein is displayed on the dashboard can be maintained on whether the dashboard is being loaded and displayed within a browser or on a mobile application ("App").

According to some embodiments, a computer-implemented method is disclosed which automatically generates and dynamically updates and maintains a multi-displayed dashboard of consistent instances across separate devices and/or network locations. According to some embodiments, the method produces and displays an interactive dashboard including electronic tiles representing data of multiple processes and operations, whereby the dashboard's look and feel are maintained regardless of the computing/display environment displaying the dashboard.

Some embodiments provide a non-transitory computer-readable storage medium for carrying out the above mentioned technical steps of the framework's functionality. The non-transitory computer-readable storage medium has tangibly stored thereon, or tangibly encoded thereon, computer readable instructions that when executed by a device (e.g., application server, messaging server, email server, ad server, content server and/or client device, and the like) cause at least one processor to perform a method for a novel and improved framework for automatically generating and dynamically updating a dashboard that provides data related to multiple processes and operations across platforms of different devices, operating environments and/or display capabilities, or some combination thereof.

In accordance with one or more embodiments, a system is provided that comprises one or more computing devices configured to provide functionality in accordance with such embodiments. In accordance with one or more embodiments, functionality is embodied in steps of a method performed by at least one computing device. In accordance with one or more embodiments, program code (or program logic) executed by a processor(s) of a computing device to implement functionality in accordance with one or more such embodiments is embodied in, by and/or on a non-transitory computer-readable medium.

According to some embodiments, a computing device is disclosed which comprises: one or more processors; and a non-transitory computer-readable memory having stored therein computer-executable instructions, that when executed by the one or more processors, cause the one or more processors to perform actions comprising: receiving, over a network, electronic data corresponding to an operation of a set of physical assets at a location, the electronic data compiled as tiles, such that each tile corresponds to operation of an asset within the set of physical assets; receiving information setting a configuration of a dashboard for a first device, the received dashboard information comprising information indicating how the tiles are to be displayed on a user interface (UI) of the first device; storing, in a database associated with the computing device, the dashboard information; receiving, over a network, from a second device, a request to access and display the dashboard; analyzing, based on the request, capability information of the second device, and based on the analysis, determining display and rendering capabilities of the second device; modifying, in response to the second device request, the stored dashboard information based on the determined display and rendering capabilities of the second device; compiling a version of the dashboard for display on a display of the second device based on the modified dashboard information; and automatically causing, over the network, the compiled dashboard to be displayed on the display of the second device.

In some embodiments, the compiling a version further comprises: creating a new version of the dashboard based on the determined display and rendering capabilities of the second device; and storing the new version in association with the dashboard information. In some embodiments, the communication is based on the new version.

In some embodiments, the compiling a version further comprises: modifying attributes of the dashboard information based on the determined display and rendering capabilities of the second device; and storing the modified attributes in the storage in relation to the stored dashboard information. In some embodiments, the communication is based on the dashboard information and stored modified attributes.

In some embodiments, the stored dashboard information further comprises the electronic data of the set of tiles.

In some embodiments, the database is a cloud-based storage.

In some embodiments, the request to access and display the dashboard comprises the capability information.

In some embodiments, the dashboard information comprises data selected from a group consisting of: display size, color, dimension, font, layout, format, configuration, layer, organization, pixel data, resolution, scrollability, amount of available screen real estate, operating system, network bandwidth, service provider and user identity.

In some embodiments, the dashboard information is stored as a template indicating a configuration, format and layout of the set of tiles.

In some embodiments, the capability information of the second device comprises data selected from a group consisting of: display size, color, dimension, font, layout, format, configuration, layer, organization, pixel data, resolution, scrollability, amount of available screen real estate, operating system, network bandwidth, service provider and user identity.

In some embodiments, the actions further comprise: receiving information related to an update of electronic data related to a first tile within the set of tiles; and updating, within a dashboard displayed on the first device, content displayed within the first tile based on the received information.

In some embodiments, the actions further comprise: retrieving, from the database, dashboard information for the second device; modifying the updated first tile based on the second device dashboard information; and communicating information related to the modified tile to the dashboard for display on the second device.

In some embodiments, the actions further comprise: causing, over a network, a dashboard display on the first device and the dashboard display on the second device to operate as a collaborate environment, such that modifications on one device are automatically caused to be performed on the other device.

BRIEF DESCRIPTION OF THE DRAWINGS

The foregoing and other objects, features, and advantages of the disclosure will be apparent from the following description of embodiments as illustrated in the accompanying drawings, in which reference characters refer to the same parts throughout the various views. The drawings are not necessarily to scale, emphasis instead being placed upon illustrating principles of the disclosure:

FIG. 5 illustrates a non-limiting example of a list of dashboards in web and mobile view according to some embodiments of the present disclosure;

FIG. 7 illustrates a non-limiting example embodiment of a dashboard according to some embodiments of the present disclosure; and FIG. 8 details a non-limiting data flow according to some embodiments of the present disclosure.

DESCRIPTION OF EMBODIMENTS

Figure 1:
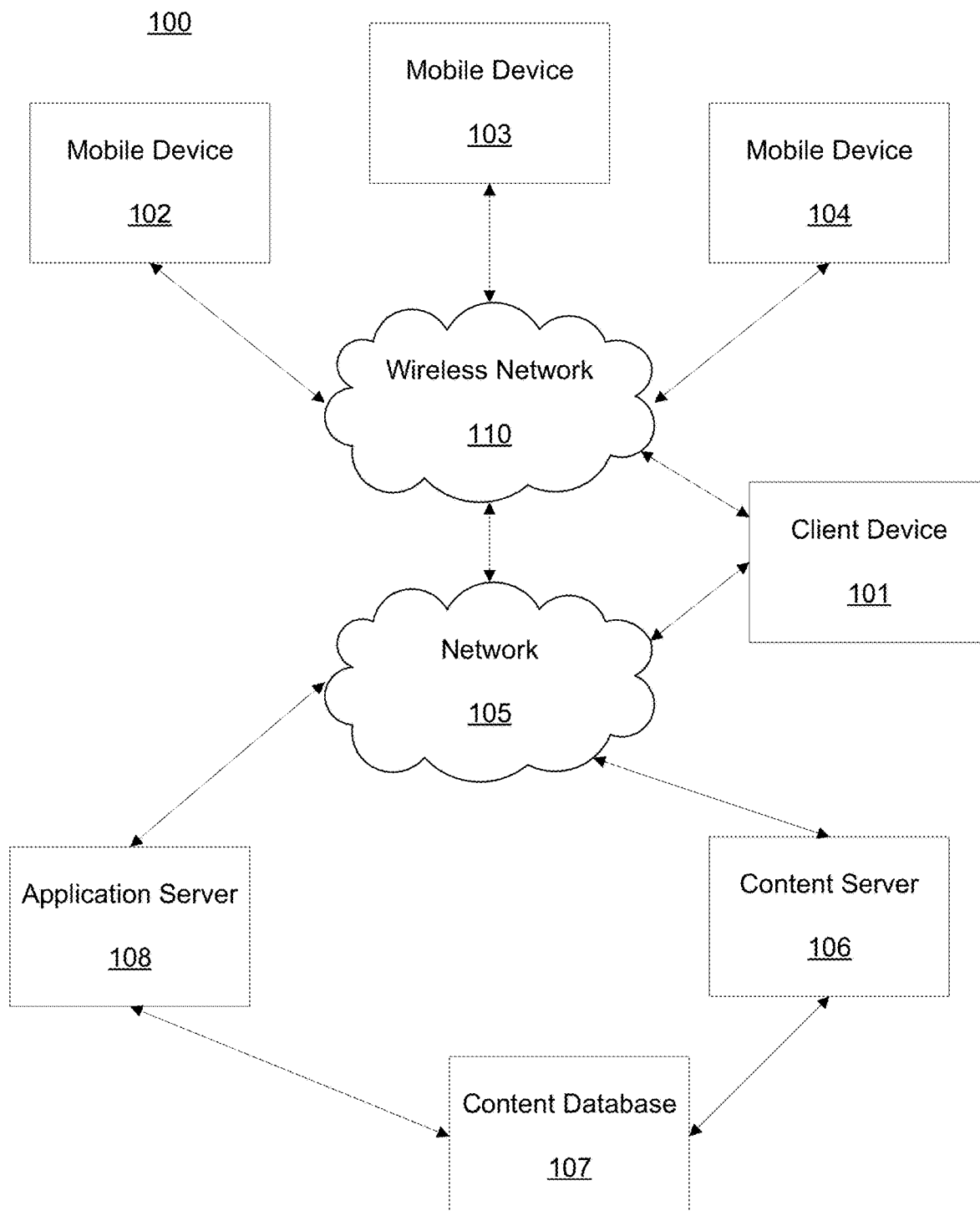
FIG. 1 is a schematic diagram illustrating an example of a network within which the systems and methods disclosed herein could be implemented according to some embodiments of the present disclosure.

The present disclosure will now be described more fully hereinafter with reference to the accompanying drawings, which form a part hereof, and which show, by way of non-limiting illustration, certain example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in some embodiments" as used herein does not necessarily refer to the same embodiment and the phrase "in another embodiment" as used herein does not necessarily refer to a different embodiment. It is intended, for example, that claimed subject matter include combinations of example embodiments in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

The present disclosure is described below with reference to block diagrams and operational illustrations of methods and devices. It is understood that each block of the block diagrams or operational illustrations, and combinations of blocks in the block diagrams or operational illustrations, can be implemented by means of analog or digital hardware and computer program instructions. These computer program instructions can be provided to a processor of a general purpose computer to alter its function as detailed herein, a special purpose computer, ASIC, or other programmable data processing apparatus, such that the instructions, which execute via the processor of the computer or other programmable data processing apparatus, implement the functions/acts specified in the block diagrams or operational block or blocks. In some alternate implementations, the functions/acts noted in the blocks can occur out of the order noted in the operational illustrations. For example, two blocks shown in succession can in fact be executed substantially concurrently or the blocks can sometimes be executed in the reverse order, depending upon the functionality/acts involved.

For the purposes of this disclosure, a non-transitory computer readable medium (or computer-readable storage medium/media) stores computer data, which data can include computer program code (or computer-executable instructions) that is executable by a computer, in machine readable form. By way of example, and not limitation, a computer readable medium may comprise computer readable storage media, for tangible or fixed storage of data, or communication media for transient interpretation of code-containing signals. Computer readable storage media, as used herein, refers to physical or tangible storage (as opposed to signals) and includes without limitation volatile and non-volatile, removable and non-removable media implemented in any method or technology for the tangible storage of information such as computer-readable instructions, data structures, program modules or other data. Computer readable storage media includes, but is not limited to, RAM, ROM, EPROM, EEPROM, flash memory or other solid state memory technology, CD-ROM, DVD, or other optical storage, cloud storage, magnetic cassettes, magnetic tape, magnetic disk storage or other magnetic storage devices, or any other physical or material medium which can be used to tangibly store the desired information or data or instructions and which can be accessed by a computer or processor.

For the purposes of this disclosure the term "server" should be understood to refer to a service point which provides processing, database, and communication facilities. By way of example, and not limitation, the term "server" can refer to a single, physical processor with associated communications and data storage and database facilities, or it can refer to a networked or clustered complex of processors and associated network and storage devices, as well as operating software and one or more database systems and application software that support the services provided by the server. Cloud servers are examples.

For the purposes of this disclosure, a "network" should be understood to refer to a network that may couple devices so that communications may be exchanged, such as between a server and a client device or other types of devices, including between wireless devices coupled via a wireless network, for example. A network may also include mass storage, such as network attached storage (NAS), a storage area network (SAN), a content delivery network (CDN) or other forms of computer or machine readable media, for example. A network may include the Internet, one or more local area networks (LANs), one or more wide area networks (WANs), wire-line type connections, wireless type connections, cellular or any combination thereof. Likewise, sub-networks, which may employ differing architectures or may be compliant or compatible with differing protocols, may interoperate within a larger network.

For purposes of this disclosure, a "wireless network" should be understood to couple client devices with a network. A wireless network may employ stand-alone ad-hoc networks, mesh networks, Wireless LAN (WLAN) networks, cellular networks, or the like. A wireless network may further employ a plurality of network access technologies, including Wi-Fi, Long Term Evolution (LTE), WLAN, Wireless Router (WR) mesh, or 2nd, 3rd, $4^{th}$ or $5^{th}$ generation (2G, 3G, 4G or 5G) cellular technology, Bluetooth, 802.11b/g/n, or the like. Network access technologies may enable wide area coverage for devices, such as client devices with varying degrees of mobility, for example.

In short, a wireless network may include virtually any type of wireless communication mechanism by which signals may be communicated between devices, such as a client device or a computing device, between or within a network, or the like.

A computing device may be capable of sending or receiving signals, such as via a wired or wireless network, or may be capable of processing or storing signals, such as in memory as physical memory states, and may, therefore, operate as a server. Thus, devices capable of operating as a server may include, as examples, dedicated rack-mounted servers, desktop computers, laptop computers, set top boxes, integrated devices combining various features, such as two or more features of the foregoing devices, or the like.

For purposes of this disclosure, a client (or consumer or user) device may include a computing device capable of sending or receiving signals, such as via a wired or a wireless network. A client device may, for example, include a desktop computer or a portable device, such as a cellular telephone, a smart phone, a display pager, a radio frequency (RF) device, an infrared (IR) device an Near Field Communication (NFC) device, a Personal Digital Assistant (PDA), a handheld computer, a tablet computer, a phablet, a laptop computer, a set top box, a wearable computer, smart watch, an integrated or distributed device combining various features, such as features of the forgoing devices, or the like.

A client device may vary in terms of capabilities or features. Claimed subject matter is intended to cover a wide range of potential variations, such as a web-enabled client device or previously mentioned devices may include a high-resolution screen (HD or 4K for example), one or more physical or virtual keyboards, mass storage, one or more accelerometers, one or more gyroscopes, global positioning system (GPS) or other location-identifying type capability, or a display with a high degree of functionality, such as a touch-sensitive color 2D or 3D display, for example.

Certain embodiments will now be described in greater detail with reference to the figures. In general, with reference to FIG. 1, a system 100 in accordance with some embodiments of the present disclosure is shown. FIG. 1 shows components of a general environment in which the systems and methods discussed herein may be practiced. Not all the components may be required to practice the disclosure, and variations in the arrangement and type of the components may be made without departing from the spirit or scope of the disclosure. As shown, system 100 of FIG. 1 includes local area networks ("LANs")/wide area networks ("WANs")—network 105, wireless network 110, mobile devices (client devices) 102-104 and client device 101. FIG. 1 additionally includes a variety of servers, such as content server 106 and application (or "App") server 108.

Some embodiments of mobile devices 102-104 may include virtually any portable computing device capable of receiving and sending a message over a network, such as network 105, wireless network 110, or the like. Mobile devices 102-104 may also be described generally as client devices that are configured to be portable. Thus, mobile devices 102-104 may include virtually any portable computing device capable of connecting to another computing device and receiving information, as discussed above.

Mobile devices 102-104 also may include at least one client application that is configured to receive content from another computing device. In some embodiments, mobile devices 102-104 may also communicate with non-mobile client devices, such as client device 101, or the like. In some embodiments, such communications may include sending and/or receiving messages, creating and uploading documents, searching for, viewing and/or sharing memes, photographs, digital images, audio clips, video clips, or any of a variety of other forms of communications.

Client devices 101-104 may be capable of sending or receiving signals, such as via a wired or wireless network, or may be capable of processing or storing signals, such as in memory as physical memory states, and may, therefore, operate as a server.

In some embodiments, wireless network 110 is configured to couple mobile devices 102-104 and its components with network 105. Wireless network 110 may include any of a variety of wireless sub-networks that may further overlay stand-alone ad-hoc networks, and the like, to provide an infrastructure-oriented connection for mobile devices 102-104.

In some embodiments, network 105 is configured to couple content server 106, application server 108, or the like, with other computing devices, including, client device 101, and through wireless network 110 to mobile devices 102-104. Network 105 is enabled to employ any form of computer readable media or network for communicating information from one electronic device to another.

In some embodiments, the content server 106 may include a device that includes a configuration to provide any type or form of content via a network to another device. Devices that may operate as content server 106 include personal computers, desktop computers, multiprocessor systems, microprocessor-based or programmable consumer electronics, network PCs, servers, and the like. In some embodiments, content server 106 can further provide a variety of services that include, but are not limited to, email services, instant messaging (IM) services, streaming and/or downloading media services, search services, photo services, web services, social networking services, news services, third-party services, audio services, video services, SMS services, MMS services, FTP services, voice over IP (VOIP) services, or the like. Such services, for example the email services and email platform, can be provided via the message server 120.

In some embodiments, users are able to access services provided by servers 106 and 108. This may include in a non-limiting example, authentication servers, search servers, email servers, social networking services servers, SMS servers, IM servers, MMS servers, exchange servers, photo-sharing services servers, and travel services servers, via the network 105 using their various devices 101-104.

In some embodiments, application server 108, for example, can store various types of applications and application related information including application data and user profile information (e.g., identifying, generated and/or observed information associated with a user).

In some embodiments, content server 106 and app server 108 can store various types of data related to the content and services each provide, observe, identify, determine, generate, modify, retrieve and/or collect. Such data can be stored in an associated content database 107, as discussed in more detail below.

In some embodiments, server 106 and/or 108 can be embodied as a cloud server or configured for hosting cloud services, as discussed herein.

In some embodiments, the network 105 is also coupled with/connected to a Trusted Search Server (TSS) which can be utilized to render content in accordance with the embodiments discussed herein. Embodiments exist where the TSS functionality can be embodied within servers 106 and 108.

Moreover, although FIG. 1 illustrates servers 106 and 108 as single computing devices, respectively, the disclosure is not so limited. For example, one or more functions of servers 106 and 108 may be distributed across one or more distinct computing devices. Moreover, in some embodiments, servers 106 and 108 may be integrated into a single computing device, without departing from the scope of the present disclosure.

Additionally, while the illustrated embodiment in FIG. 1 depicts only servers 106 and 108, it should not be construed as limiting, as any type and number of servers can be included therein.

Figure 2:
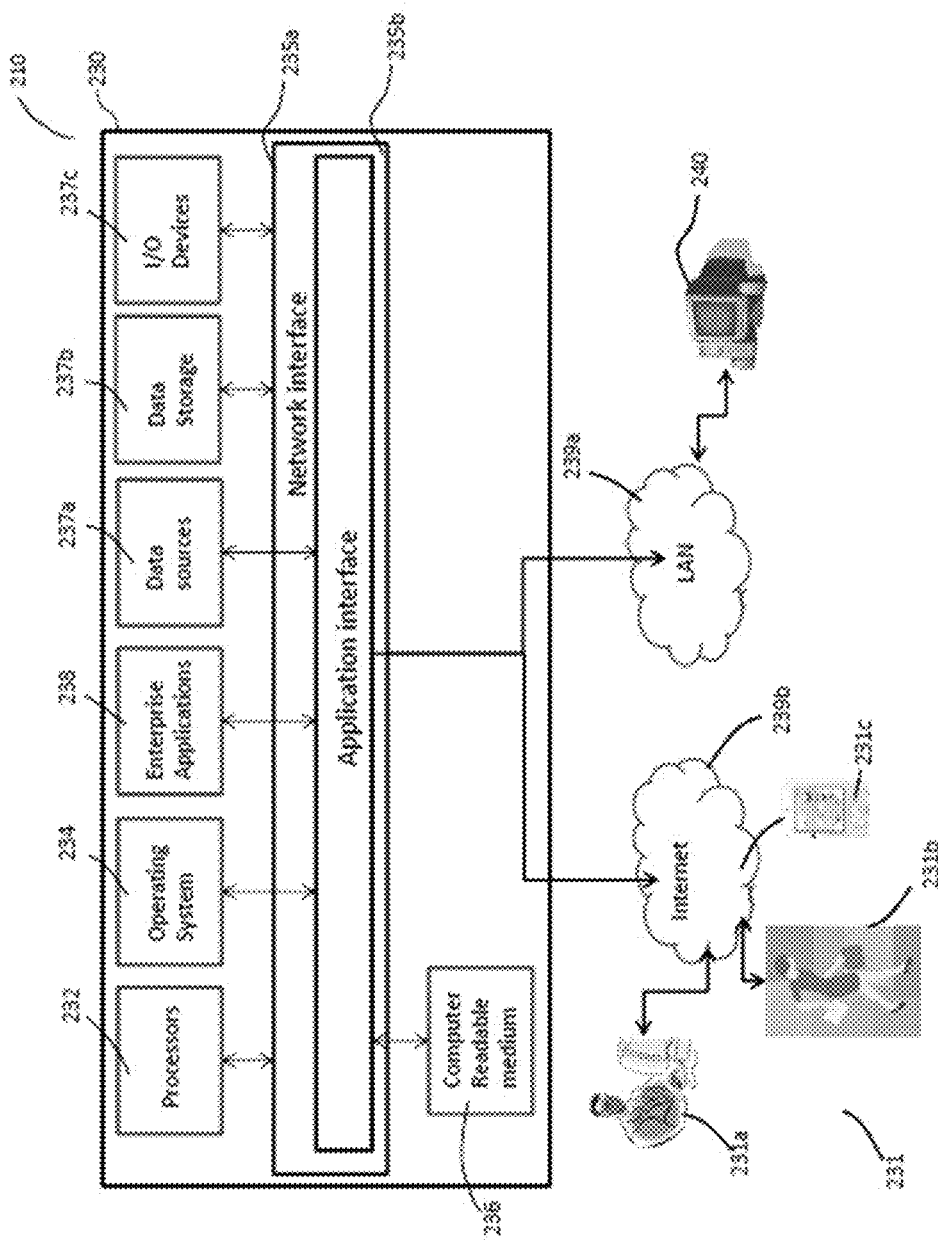
FIG. 2 is a schematic diagram illustrating an example of a network within which the systems and methods disclosed herein could be implemented according to some embodiments of the present disclosure.

Turning to FIG. 2, computer system 210 is depicted and is a non-limiting example embodiment of system 100 discussed above in relation to FIG. 1.

FIG. 2 illustrates a computer system 210 enabling or operating an embodiment of system 100 of FIG. 1, as discussed below. In some embodiments, computer system 210 can include and/or operate and/or process computer-executable code of one or more of the above-mentioned program logic, software modules, and/or systems. Further, in some embodiments, the computer system 210 can operate and/or display information within one or more graphical user interfaces. In some embodiments, the computer system 210 can comprise a cloud server and/or can be coupled to one or more cloud-based server systems.

In some embodiments, the system 210 can comprise at least one computing device 230 including at least one processor 232. In some embodiments, the at least one processor 232 can include a processor residing in, or coupled to, one or more server platforms. In some embodiments, the system 210 can include a network interface 235*a* and an application interface 235*b* coupled to the least one processor 232 capable of processing at least one operating system 234. Further, in some embodiments, the interfaces 235*a*, 235*b* coupled to at least one processor 232 can be configured to process one or more of the software modules 238 (e.g., such as enterprise applications). In some embodiments, the software modules 238 can include server-based software, and can operate to host at least one user account and/or at least one client account, and operating to transfer data between one or more of these accounts using the at least one processor 232.

With the above embodiments in mind, it should be understood that some embodiments can employ various computer-implemented operations involving data stored in computer systems. Moreover, the above-described databases and models described throughout can store analytical models and other data on computer-readable storage media within the system 210 and on computer-readable storage media coupled to the system 210. In addition, the above-described applications of the system can be stored on non-transitory computer-readable storage media within the system 210 and on computer-readable storage media coupled to the system 210.

In some embodiments, the system 210 can comprise at least one non-transitory computer readable medium 236 coupled to at least one data source 237*a*, and/or at least one data storage device 237*b*, and/or at least one input/output device 237*c*. In some embodiments, the disclosed systems and methods can be embodied as computer readable code on a computer readable medium 236. In some embodiments, the computer readable medium 236 can be any data storage device that can store data, which can thereafter be read by a computer system (such as the system 210). In some embodiments, the computer readable medium 236 can be any physical or material medium that can be used to tangibly store the desired information or data or instructions and which can be accessed by a computer or processor 232. In some embodiments, at least one of the software modules 238 can be configured within the system to output data to at least one user 231 via at least one graphical user interface rendered on at least one digital display.

In some embodiments, the non-transitory computer readable medium 236 can be distributed over a conventional computer network via the network interface 235a where the system embodied by the computer readable code can be stored and executed in a distributed fashion. For example, in some embodiments, one or more components of the system 210 can be coupled to send and/or receive data through a local area network ("LAN") 239a and/or an internet coupled network 239b (e.g., such as a wireless internet). In some further embodiments, the networks 239a, 239b can include wide area networks ("WAN"), direct connections (e.g., through a universal serial bus port), or other forms of computer-readable media 236, or any combination thereof.

In some embodiments, components of the networks 239a, 239b can include any number of user devices such as personal computers including for example desktop computers, and/or laptop computers, or any fixed, generally non-mobile internet appliances coupled through the LAN 239a. For example, some embodiments include personal computers 240a coupled through the LAN 239a that can be configured for any type of user including an administrator. Other embodiments can include personal computers coupled through network 239b. In some further embodiments, one or more components of the system 210 can be coupled to send or receive data through an internet network (e.g., such as network 239b). For example, some embodiments include at least one user 231 coupled wirelessly and accessing one or more software modules of the system including at least one enterprise application 238 via an input and output ("I/O") device 237c. In some other embodiments, the system 210 can enable at least one user 231 to be coupled to access enterprise applications 238 via an I/O device 237c through LAN 239a. In some embodiments, the user 231 can comprise a user 231a coupled to the system 210 using a desktop computer, and/or laptop computers, or any fixed, generally non-mobile internet appliances coupled through the internet 239b. In some embodiments, the user 231 can comprise a mobile user 231b coupled to the system 210. In some embodiments, the user 231b can use any mobile computing device 231c to wirelessly coupled to the system 210, including, but not limited to, personal digital assistants, and/or cellular phones, mobile phones, or smart phones, and/or pagers, and/or digital tablets, and/or fixed or mobile internet appliances.

Figure 3:
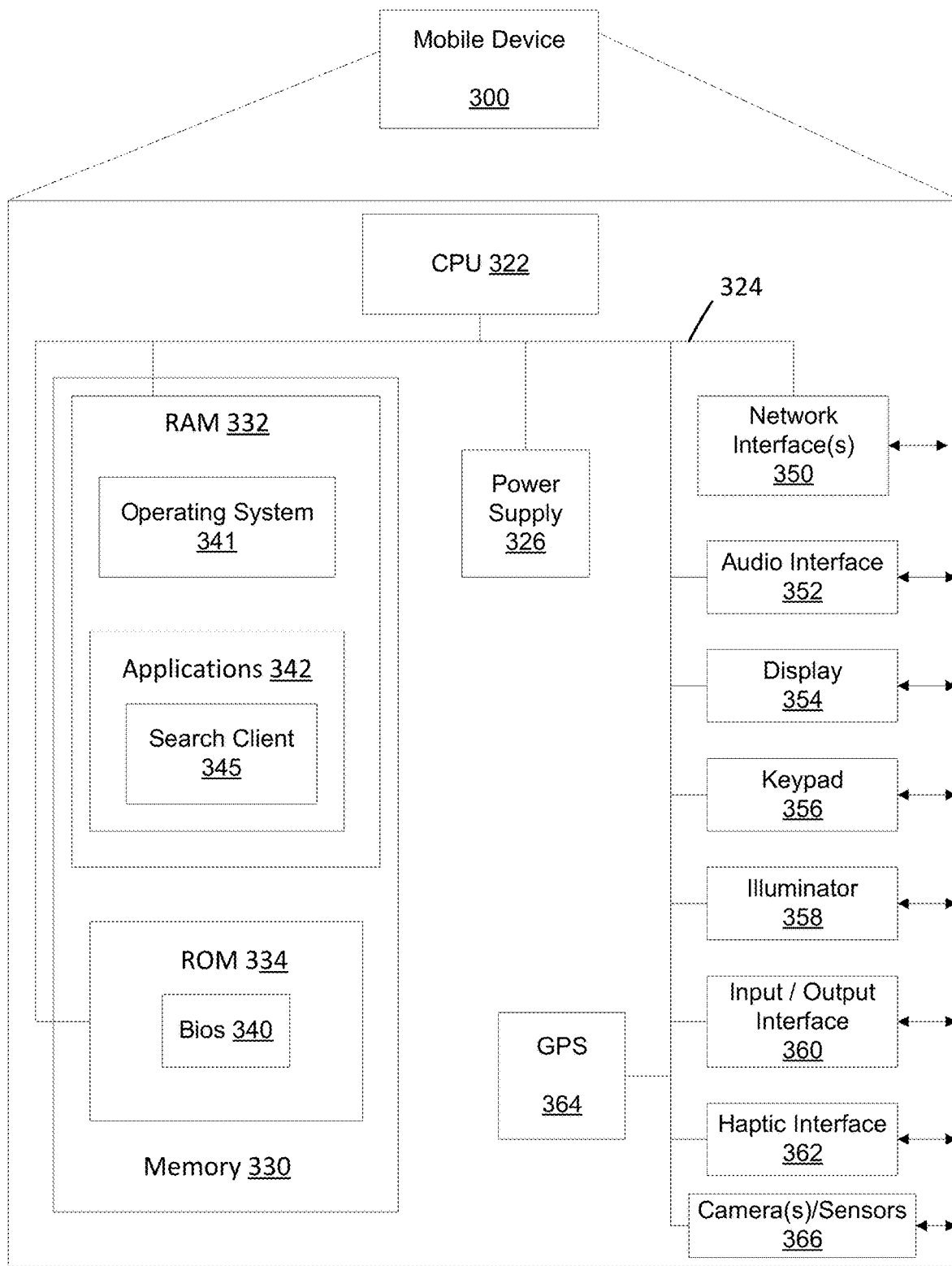
FIG. 3 depicts is a schematic diagram illustrating an example of client device according to some embodiments of the present disclosure.

FIG. 3 is a schematic diagram illustrating a client device showing an example embodiment of a client device that may be used within the present disclosure. Client device 300 may include many more or less components than those shown in FIG. 3. However, the components shown are sufficient to disclose an illustrative embodiment for implementing the present disclosure. Client device 300 may represent, for example, client devices discussed above in relation to FIGS. 1-2.

As shown in FIG. 3, in some embodiments, Client device 300 includes a processing unit (CPU) 322 in communication with a mass memory 330 via a bus 324. In some embodiments, Client device 300 also includes a power supply 326, one or more network interfaces 350, an audio interface 352, a display 354, a keypad 356, an illuminator 358, an input/output interface 360, a haptic interface 362, an optional global positioning systems (GPS) receiver 364 and a camera(s) or other optical, thermal or electromagnetic sensors 366. Device 300 can include one camera/sensor 366, or a plurality of cameras/sensors 366, as understood by those of skill in the art. Power supply 326 provides power to Client device 300.

Client device 300 may optionally communicate with a base station (not shown), or directly with another computing device. Network interface 350 is sometimes known as a transceiver, transceiving device, or network interface card (NIC).

In some embodiments, audio interface 352 is arranged to produce and receive audio signals such as the sound of a human voice. Display 354 may be a liquid crystal display (LCD), gas plasma, light emitting diode (LED), or any other type of display used with a computing device. Display 354 may also include a touch sensitive screen arranged to receive input from an object such as a stylus or a digit from a human hand.

Keypad 356 may comprise any input device arranged to receive input from a user. Illuminator 358 may provide a status indication and/or provide light.

In some embodiments, client device 300 also comprises input/output interface 360 for communicating with external. Input/output interface 360 can utilize one or more communication technologies, such as USB, infrared, Bluetooth™, or the like. In some embodiments, haptic interface 362 is arranged to provide tactile feedback to a user of the client device.

Optional GPS transceiver 364 can determine the physical coordinates of Client device 300 on the surface of the Earth, which typically outputs a location as latitude and longitude values. GPS transceiver 364 can also employ other geo-positioning mechanisms, including, but not limited to, tri-angulation, assisted GPS (AGPS), E-OTD, CI, SAI, ETA, BSS or the like, to further determine the physical location of Client device 300 on the surface of the Earth. In some embodiments, however, Client device may through other components, provide other information that may be employed to determine a physical location of the device, including for example, a MAC address, Internet Protocol (IP) address, or the like.

In some embodiments, mass memory 330 includes a RAM 332, a ROM 334, and other storage means. Mass memory 330 illustrates another example of computer storage media for storage of information such as computer readable instructions, data structures, program modules or other data. Mass memory 330 stores a basic input/output system ("BIOS") 340 for controlling low-level operation of Client device 300. The mass memory also stores an operating system 341 for controlling the operation of Client device 300.

In some embodiments, memory 330 further includes one or more data stores, which can be utilized by Client device 300 to store, among other things, applications 342 and/or other information or data. For example, data stores may be employed to store information that describes various capabilities of Client device 300. The information may then be provided to another device based on any of a variety of events, including being sent as part of a header (e.g., index file of the HLS stream) during a communication, sent upon request, or the like. At least a portion of the capability information may also be stored on a disk drive or other storage medium (not shown) within Client device 300.

In some embodiments, applications 342 may include computer executable instructions which, when executed by Client device 300, transmit, receive, and/or otherwise process audio, video, images, and enable telecommunication with a server and/or another user of another client device. In some embodiments, applications 342 may further include search client 345 that is configured to send, to receive, and/or to otherwise process a search query and/or search result.

Having described the components of the general architecture employed within some embodiments, the components' general operation with respect to some embodiments will now be described below.

Figure 4:
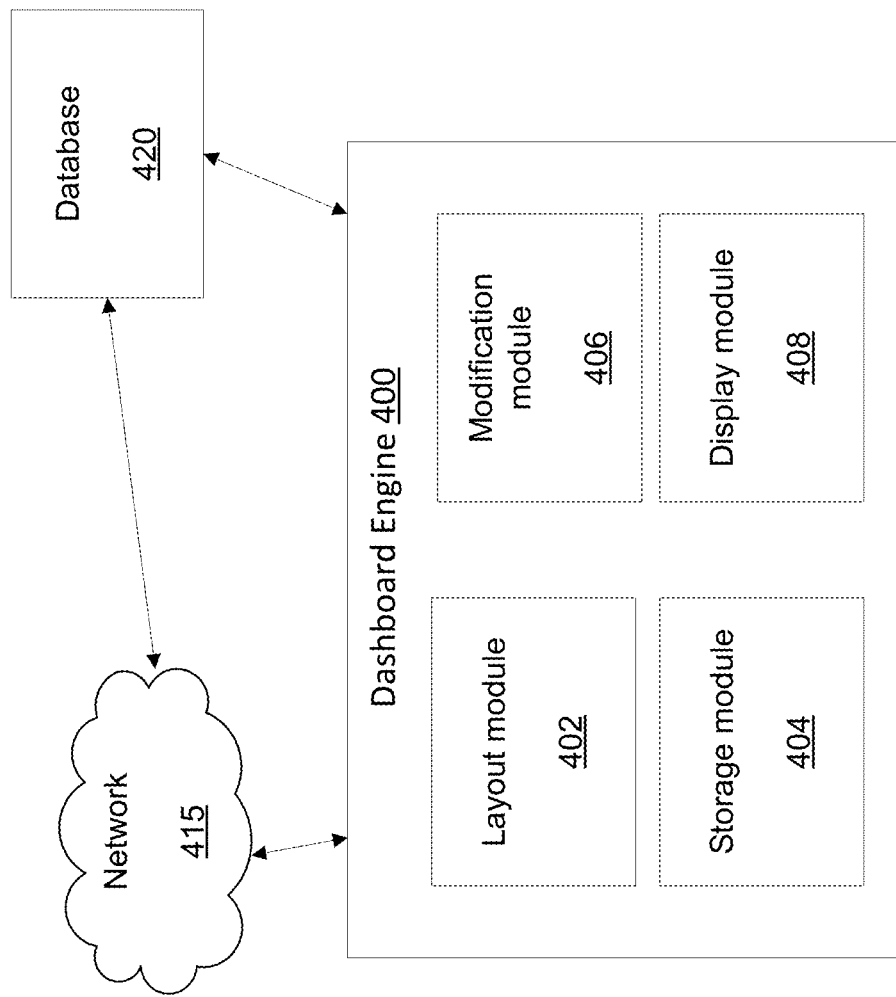
FIG. 4 is a block diagram illustrating components of an exemplary system in accordance with embodiments of the present disclosure.

FIG. 4 is a block diagram illustrating the components of some embodiments. FIG. 4 includes dashboard engine 400, network 415 and database 420. The dashboard engine 400 can be a special purpose machine or processor and could be hosted by a cloud server (e.g., cloud web services server(s)), messaging server, application server, content server, social networking server, web server, search server, content provider, third party server, user's computing device, and the like, or any combination thereof.

According to some embodiments, dashboard engine 400 can be embodied as a stand-alone application that executes on a server and/or user device (e.g., on a cloud server and/or on-prem on a user device or local storage). In some embodiments, the dashboard engine 400 can function as an application installed on a device; and, in some embodiments, such application can be a web-based application accessed by a device over a network.

The database 420 can be any type of database or memory, and can be associated with a content server on a network (e.g., cloud server, content server, a search server or application server) or a user's device (e.g., client devices discussed above in FIGS. 1-3). Database 420 comprises a dataset of data and metadata associated with local and/or network information related to users, services, applications, content and the like. Such information can be stored and indexed in the database 420 independently and/or as a linked or associated dataset. As discussed above, it should be understood that the data (and metadata) in the database 420 can be any type of information and type, whether known or to be known, without departing from the scope of the present disclosure.

According to some embodiments, database 420 can store data and metadata associated with users, operations, tasks, assets, files, projects, versions, synchronization events, schedules, images, videos, text, messages, products, items and services from an assortment of media and/or service providers and/or platforms, and the like.

According to some embodiments, database 420 can store data for users, e.g., user data. According to some embodiments, the stored user data can include, but is not limited to, information associated with a user's profile, user interests, user behavioral information, user attributes, user preferences or settings, user demographic information, user location information, user biographic information, and the like, or some combination thereof.

In some embodiments, the user data can also include user device information, including, but not limited to, device identifying information, device capability information, voice/data carrier information, applications installed or capable of being installed or executed on such device, and/or any, or some combination thereof. It should be understood that the data (and metadata) in the database 420 can be any type of information related to a user, asset, location, job, operation, content, a device, an application, a service provider, a content provider, whether known or to be known, without departing from the scope of the present disclosure.

As discussed above, with reference to FIGS. 1-2, the network 415 can be any type of network such as, but not limited to, a wireless network, a local area network (LAN), wide area network (WAN), the Internet, or a combination thereof. The network 415 facilitates connectivity of the dashboard engine 400, and the database of stored resources 420. Indeed, as illustrated in FIG. 4, the dashboard engine 400 and database 420 can be directly connected by any known or to be known method of connecting and/or enabling communication between such devices and resources.

The principal processor, server, or combination of devices that comprises hardware programmed in accordance with the special purpose functions herein is referred to for convenience as dashboard engine 400, and includes layout module 402, storage module 404, modification module 406, display module 408. It should be understood that the engine(s) and modules discussed herein are non-exhaustive, as additional or fewer engines and/or modules (or sub-modules) may be applicable to the embodiments of the systems and methods discussed. The operations, configurations and functionalities of each module, and their role within embodiments of the present disclosure will be discussed below.

Figure 6:
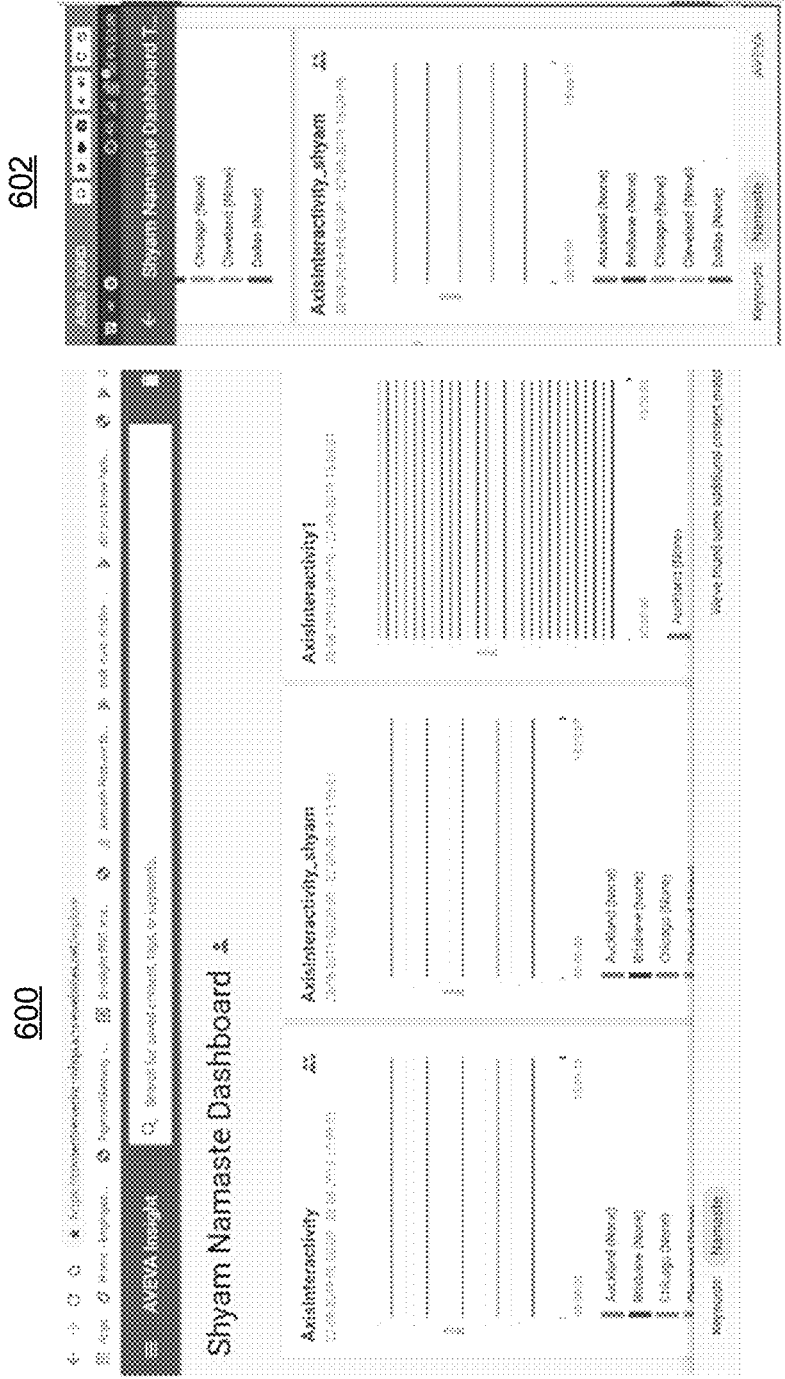
FIG. 6 illustrates a non-limiting example embodiment of an open dashboard in a web environment with adoptive display in a mobile environment according to some embodiments of the present disclosure.

Turning now to FIGS. 5-7, embodiments are discussed that disclose examples of how a dashboard can be displayed across separate platforms, on different types of devices and/or different types of operating systems or some combination thereof. It should be understood that the example embodiments and depictions in FIGS. 5-7 are non-limiting, as variations in the displayed user interface (UI) elements, as well as the manner in which a UI is transformed from one platform to another to maintain the same look and feel would be understood by those of skill in the art, and will be discussed in more detail below in relation to Process 800 of FIG. 8.

FIG. 5 illustrates a non-limiting example embodiment of a dashboard instance being displayed in a web environment and a mobile environment. The web display 500 can be a displayed dashboard interface within a browser executing on a user's personal computing device (e.g., a laptop), for example.

The mobile display 502 corresponds to the display of the dashboard interface on a mobile device (e.g., a smart phone or tablet). In some embodiments, display 502 can correspond to a UI within a proprietary application that provides the functionality for the dashboard. For example, as discussed above, display 502 can correspond to a mobile App hosting and executing engine 400's functionality.

In some embodiments, display 502 can be a third party application or a browser application interface that is executing on a mobile device.

As discussed in more detail below, the electronic or digital information displayed on interfaces 500 and 502 are displayed in a manner that leverages the capabilities of the displaying device in order to maintain the look and feel of the dashboard and/or data being displayed.

By way of a non-limiting example, a user opens display 500 on his personal computer (e.g., laptop). After setting up the dashboard, the display 500 is stored. The user then opens a mobile App on his mobile device and renders the dashboard as mobile display 502. As discussed in more detail below in relation to FIG. 8, display 502 is a modification of display 500 based on the display and rendering capabilities, among other features, of the mobile device providing display 502.

According to some embodiments, as discussed in more detail below, when changes are effected on display 500, they are automatically produced or occur on display 502. This also occurs in the opposite direction from display 502 to display 500. This ensures that the dashboard is continuously displaying the same information on any instance that is running.

Thus, for example, two users viewing the dashboard at different locations on different devices are simultaneously viewing the same data within a dashboard configured to maintain the same viewing experience between each user. This functionality also applies to the UIs of FIGS. 6 and 7, as discussed below.

FIG. 6 illustrates another non-limiting example embodiment of a dashboard instance being displayed in a web environment and a mobile environment. FIG. 6 illustrates how tiles (or electronic cards) displayed within the dashboard are effectively displayed in a similar format, layout and configuration to maintain the same look and feel across varying display environments.

Similar to FIG. 5, in FIG. 6, display 600 is a web display within, for example, a browser, and display 602 is a mobile display that corresponds to the display of the dashboard interface on a mobile device.

As discussed in more detail below, the electronic or digital information displayed on interfaces 600 and 602 are displayed in a manner that leverages the capabilities of the displaying device in order to maintain the look and feel of the dashboard and/or data being displayed.

By way of a non-limiting example in accordance with some embodiments, the tiles within display 600 are displayed in a manner that enables all three to be viewable within the display 602 of the mobile device. For example, since it would render the data unreadable to display the three cards of 600 in landscape on a horizontal axis as displayed in display 600, within the mobile display 600, the dashboard is reconfigured to display the cards in a scrollable manner along a y-axis, thereby basing the configuration of display 602 on the display features and capabilities of the mobile device to ensure the look and feel is maintained from display 600.

FIG. 7 illustrates yet another non-limiting example embodiment of a dashboard, where an open tile displayed in a web environment (i.e., display 700) is modified and reproduced for display within a mobile environment (i.e., display 702). In a similar manner as discussed above in relation to FIGS. 5 and 6, and discussed in more detail below in relation to Process 800 of FIG. 8, the display in display 700 is a modified version of display 702, and vice versa, which enables the same data to be reproduced according to the display characteristics of the displaying device (and/or environment).

Turning now to FIG. 8, Process 800 details a non-limiting embodiment according to some embodiments for automatically generating and dynamically updating a multi-displayed dashboard of consistent instances on separate devices and/or network locations. According to some embodiments, the disclosed framework is configured to automatically generate and dynamically update and display a dashboard of multiple processes and operations across platforms of different devices, operating environments and/or display capabilities, or some combination thereof.

The development of various formats for content and different platforms for providing a uniform experience with content has led to difficulties in the display and access of the content. Content that is developed on one platform may not appear on another platform as intended by the content developer.

For example, a webpage designed for a laptop appears differently when accessed by a smart phone. As a result, the content developer may need to configure different various versions of a content item so that it maintains a uniform look and feel on different platforms. This problem can be exacerbated when multiple users are requesting and accessing the same data from different locations, devices, locations and platforms.

For example, when a user accesses and shares content for an operation, they may use different formats for their text, image or video data, and such formats may be inherent or native to the device the user is using.

Thus, the disclosed systems and methods provide functionality for computerized tools to automatically configure content (e.g., a dashboard and the data displayed therein) so that it appears uniformly across different platforms. According to some embodiments, the disclosed framework (via execution of engine 400), facilitates the generation of a dashboard's configuration, layout and display, and then ensures that such configuration, layout and display are maintained across different computing/display environments with varying degrees of functionality for displaying and rendering the dashboard in a uniform manner. This ultimately enables the content to be displayed on these platforms as intended by the generating user.

According to some embodiments, the dashboard discussed herein will be discussed in reference to electronic or digital tiles or cards (referred to as tiles). However, it should not be construed as limiting, as any type of digital information can be displayed within a dashboard interface, whether known or to be known, without departing from the scope of the instant applications' functionality of maintaining the look and feel of the dashboard across displays in a seamless manner. For example, the dashboard can display any type of image, text, video, multi-media, RSS data, graphics, graphs, icons, charts, augmented reality (AR) depictions, virtual reality depictions (VR), messages, hyperlink (or URL) or any other type of interactive data or interface objects that detail operations of an asset(s) at a location(s), and the like, or some combination thereof.

According to some embodiments, as discussed herein, when a dashboard interface (referred to as a dashboard, as illustrated in FIGS. 5-7) is opened and interacted with, the interactions are reproduced and provided to all other instances of the dashboard. In some embodiments, the changes on one dashboard instance or version (e.g., operating on one device) can take effect on stored versions of the dashboard and/or opened versions operating on other devices. This reproduction effectively provides a virtual deployment of what is occurring on one dashboard to occur on all other instances of the dashboard thereby enabling and facilitating a collaborative environment between users.

For example, as in FIG. 7, when a tile is selected and opened to a larger view within a browser (700), the mobile version 702 is modified in a similar manner. The mobile modification and auto-display of the interaction on another device occurs automatically and enables a collaborative environment to be realized so that users at different locations (or sub-locations within a single location) can effectively work together and view the same data. Additionally, this enables users to leverage the enterprise capabilities of the disclosed dashboard framework, such that the work they perform on a browser can be readily transferred and realized on their mobile device (and vice versa).

Therefore, for example, if a user works at his desktop, then has to go out the site, in some embodiments, the information is transferred to his device in a intelligible and viewable manner in direct correspondence to the browser instance, so that the user can view the data at the site.

One of skill in the art would understand that any modifications to the data and/or layout performed on the mobile site can be reverse saved so that the browser mirrors the actions on the mobile device in accordance with some embodiments.

According to some embodiments of Process 800, Steps 802-804 are performed by the layout module 402 of dashboard engine 400; Steps 806, 812 and 816 are performed by storage module 404; Steps 808 and 818 are performed by display module 408; and Steps 810 and 814 are performed by modification module 408.

Process 800 begins with Step 802 where a set of tiles are identified. According to some embodiments, the tile can be in any format and/or of any type, such as, but not limited to, a pareto card, a manufacturing execution system (MES) card, an insight chart card, an alarms card, a generic card and/or an alerts card. In some embodiments, the tiles can be specific to a location, to a set of locations, to an asset at a location, to set of assets, to an asset working multiple locations, to a time period, to a particular job, task or application/operation, and the like, or some combination thereof.

In Step 804, dashboard information is received from a first display environment, which provides an indication as to how the set of tiles will be configured, laid out and displayed within a dashboard display executed within the first display environment.

For purposes of discussion only, the first display environment will be embodied as a laptop computer operating a browser to display a dashboard. One of skill in the art would understand that the first display environment including a laptop computer is non-limiting, as any type of display device and/or platform can be implemented as a first display environment.

According to some embodiments, this information can be received, determined or otherwise identified based on a type of criteria or set of criteria that dictates dashboard information. Such criteria can be based on a user, a device, an operation, an asset, a platform, a network, a time, a location, and the like, or some combination thereof.

In some embodiments, a user can provide the dashboard information. In some embodiments, the dashboard information can be automatically determined based on and/or in accordance with user parameters, settings or selections previously supplied by a user or suppled in connection with reception of the set of tiles. In some embodiments, the dashboard information can be based on the type of tiles. In some embodiments, the dashboard information can be automatically determined by the receiving device (e.g., the server) and/or based on the device used to initially display the dashboard.

In some embodiments, the dashboard information corresponds to a format or formatting and layout of the dashboard, and a manner in which the tiles will be displayed and capable of being interacted with therein. The dashboard information can correspond to, but is not limited to, a display size, color, dimension, font, layout, format, configuration, layer, organization, pixel data, resolution, scrollability, amount of available screen real estate on a device's display, operating system of a device, network bandwidth, service provider of the device and/or server, user identity, and the like, or some combination thereof.

In some embodiments, in Step 806, the dashboard information is stored in a database (e.g., data store 420). In some embodiments, the storage of the dashboard information and information related to the set of tiles can involve the creation of data structures corresponding to a dashboard instance or version. Thus, new data can be created that is capable of being interacted with, manipulated/modified and updated, thereby increasing the efficiency in which metrics about an operation can be retrieved and provided to a requesting entity or user.

In some embodiments, the dashboard information can be stored as a template. The template can be configured according to the dashboard information such that its configuration, sizing and capabilities for displaying data are in accordance with the received information of Step 804. In some embodiments, the template can comprise modules for displaying tiles and the functionality afforded the interactive tiles, such, as but not limited to, expanding, contracting, scrolling, augmenting, searching, highlighting, providing supplemental information, and/or any other type of interactive behavior tiles provide users as a way of detailing data of operations.

Thus, in some embodiments, by way of a non-limiting example, at this point in Process 800, a dashboard is configured and capable of being displayed on a device of a first display environment.

For example, in some embodiments, as a result of the execution of Steps 802-806, a dashboard is configured and displayed—see examples in FIGS. 5, 6 and 7, displays 500, 600 and 700, respectively.

Continuing with Process 800, in some embodiments, in Step 808, a request to access a dashboard and display it from a second display environment is received. The second display environment can be a smart phone executing a mobile application installed therein. One of skill in the art would understand this embodiment of a second display environment as non-limiting, as any type of device and any type of application can be utilized without departing from the scope of the instant disclosure.

In some embodiments, in Step 810, in response to receiving the request, display and rendering capabilities of the second display environment are determined, derived, retrieved, extracted or otherwise identified. In some embodiments, the request in Step 808 can comprise display and rendering capability information of the second display environment. In some embodiments, Step 810 can include a process for retrieving and/or extracting the configuration of the second display environment from data available to engine 400 on the network.

The display and rendering capability information of the second display environment can include, but is not limited to, a display size, color, dimension, font, layout, format, configuration, layer, organization, pixel data, resolution, scrollability, amount of available screen real estate on a device's display, operating system of a device, network bandwidth, service provider of the device and/or server, user identity, and the like, or some combination thereof.

In some embodiments, Step 810's analysis of the second display environment's data to identify its display capabilities can be performed by any type of known or to be known computational analysis technique, including but not limited to, vector analysis, data mining, computer vision, machine learning, neural network, artificial intelligence, and the like, or some combination thereof.

In some embodiments, in Step 812, the data for the dashboard stored in Step 806 is retrieved. In some embodiments, such retrieval can be based on a search query that includes information requesting the dashboard instance (e.g. an operation or job identifier) and identifying information related to the second display environment. In some embodiments, the query can further include the confirmation information of the second display environment.

In some embodiments, in Step 814, the retrieved dashboard information is analyzed based on the display and rendering capability information of the second display environment (from Step 810). According to some embodiments, such analysis can involve any type of known or to be known computational analysis technique, including but not limited to, vector analysis, data mining, computer vision, machine learning, neural network, artificial intelligence, and the like, or some combination thereof.

As a result of the analysis of the stored dashboard information, the dashboard information (e.g., the template for displaying the tiles within the dashboard UI) can be modified to conform to the display and rendering capability information of the second display environment. In some embodiments, this enables the dashboard to be displayed within the second display environment at its highest quality while maintaining the look and feel it had from the first display environment.

In some embodiments, the modifications performed in Step 814 can involve, but are not limited to, modifying the traits, characteristics and/or attributes of the dashboard information. In some embodiments, the template data and/or modules' data and/or configurations can be modified and stored in a similar manner.

In some embodiments, the modifications can be added to the stored dashboard information, such that only the changes to the traits are saved to storage (e.g., the stored dashboard data objects have supplemental information stored and associated therewith within storage). This enables efficient storage (e.g., reduction on memory usage) while ensuring an efficient retrieval of data specific to the second display environment (in response to the request of Step 808 and subsequent requests).

According to some embodiments, the modifications performed in Step 814 result in a compiled new version of the dashboard. Thus, additional data objects or data structures can be created for the second display environment and stored in association with the dashboard information within storage. Step 816. Such storage can be effectuated as a second version of the dashboard information specific to a second display environment or specific to a type of the second display environment (e.g., a smart phone or type of platform or OS, for example).

In some embodiments, the storage of Step 816 (and Step 806) can involve and/or utilize any type of database or storage configuration or technology, including but not limited to, blockchain or a look-up table (LUT), for example. In some embodiments, the storage occurring in Steps 806 and/or 816 are cloud-based.

In some embodiments, the analysis of Step 814 may determine that the display and rendering capability information matches the dashboard information; therefore, no modification is required and Process 800 ends. For example, first display environment and second display environment have computing devices, associated displays and/or network characteristics that are at least similar to a threshold degree whereby the dashboard template stored in Step 806 is the best option for reproducing the dashboard within the second display environment with the same look and feel as the first display environment.

In Step 818, the modified dashboard display is automatically communicated and caused to be displayed within the second display environment.

Thus, for example, as a result of Steps 808-818, the dashboard's displayed in FIGS. 5, 6 and 7 as displays 500, 600 and 700, respectively, are reconfigured and automatically displayed as displays 502, 602 and 702, respectively.

In some embodiments, the modification in Step 814 can be performed on the network such that the dashboard is updated and then is sent to the second display environment. This, for example, increases efficiency in the way tiles and other dashboard data is displayed as the processing of the dashboard's display modification(s) occurs on the server side as a pre-processing step thereby offloading the resources required to perform the manipulation and modification of the dashboard/tiles from the display device.

In some embodiments, as tile data is updated (e.g., received tile data as in Step 802), the tile data can be stored (e.g., Step 806) and pre-processed in a similar manner as discussed in relation to Steps 814-816. Then, the dashboard can be dynamically updated based on the updated tile data, which can change which tiles are displayed, how they are organized and/or configured and the like, as discussed above.

In some embodiments, based on network capabilities, the dashboard information and modification instructions can be sent to the second display environment for modification on the client side.

For the purposes of this disclosure a module is a software, hardware, or firmware (or combinations thereof) system, process or functionality, or component thereof, that performs or facilitates the processes, features, and/or functions described herein (with or without human interaction or augmentation). A module can include sub-modules. Software components of a module may be stored on a computer readable medium for execution by a processor. Modules may be integral to one or more servers, or be loaded and executed by one or more servers. One or more modules may be grouped into an engine or an application.

For the purposes of this disclosure the term "user", "subscriber" "consumer" or "customer" should be understood to refer to a user of an application or applications as described herein and/or a consumer of data supplied by a data provider. By way of example, and not limitation, the term "user" or "subscriber" can refer to a person who receives data provided by the data or service provider over the Internet in a browser session, or can refer to an automated software application which receives the data and stores or processes the data.

Those skilled in the art will recognize that the methods and systems of the present disclosure may be implemented in many manners and as such are not to be limited by the foregoing exemplary embodiments and examples. In other words, functional elements being performed by single or multiple components, in various combinations of hardware and software or firmware, and individual functions, may be distributed among software applications at either the client level or server level or both. In this regard, any number of the features of the different embodiments described herein may be combined into single or multiple embodiments, and alternative embodiments having fewer than, or more than, all of the features described herein are possible.

Functionality may also be, in whole or in part, distributed among multiple components, in manners now known or to become known. Thus, myriad software/hardware/firmware combinations are possible in achieving the functions, features, interfaces and preferences described herein. Moreover, the scope of the present disclosure covers conventionally known manners for carrying out the described features and functions and interfaces, as well as those variations and modifications that may be made to the hardware or software or firmware components described herein as would be understood by those skilled in the art now and hereafter.

Furthermore, the embodiments of methods presented and described as flowcharts in this disclosure are provided by way of example in order to provide a more complete understanding of the technology. The disclosed methods are not limited to the operations and logical flow presented herein. Alternative embodiments are contemplated in which the order of the various operations is altered and in which sub-operations described as being part of a larger operation are performed independently.

While various embodiments have been described for purposes of this disclosure, such embodiments should not be deemed to limit the teaching of this disclosure to those embodiments. Various changes and modifications may be made to the elements and operations described above to obtain a result that remains within the scope of the systems and processes described in this disclosure.

What is claimed is:

1. A computing device comprising:
one or more processors; and
a non-transitory computer-readable memory having stored therein computer-executable instructions, that when executed by the one or more processors, cause the one or more processors to perform actions comprising:
receiving, over a network, electronic data corresponding to an operation of a set of physical assets at a location, the electronic data compiled as tiles, such that each tile corresponds to an operation of an asset within said set of physical assets;
receiving dashboard information setting a configuration of a dashboard for a first device, the received dashboard information comprising information indicating how the tiles are to be displayed on a user interface (UI) of the first device;
storing, in a database associated with the computing device, the received dashboard information;
receiving, over a network, from a second device, a request to access and display the dashboard;
analyzing, based on said request, capability information of the second device, and based on said analysis, determining display and rendering capabilities of the second device;
modifying, in response to the second device request, the stored received dashboard information based on the determined display and rendering capabilities of the second device to obtain modified dashboard information, the modified dashboard information comprises data selected from a group consisting of: display size, color, dimension, font, layout, format, configuration, layer, organization, pixel data, resolution, scrollability, amount of available screen real estate, operating system, network bandwidth, service provider and user identity;
compiling a version of the dashboard for display on a display of the second device based on the modified dashboard information to obtain a compiled dashboard; and
automatically causing, over the network, the compiled dashboard to be displayed on the display of the second device.

2. The computing device of claim 1, wherein said stored dashboard information further comprises the electronic data of the set of tiles.

3. The computing device of claim 1, wherein said database is a cloud-based storage.

4. The computing device of claim 1, wherein said request to access and display the dashboard comprises said capability information.

5. The computing device of claim 1, wherein the dashboard information is stored as a template indicating a configuration, format and layout of the set of tiles.

6. The computing device of claim 1, wherein the capability information of the second device comprises data selected from a group consisting of: display size, color, dimension, font, layout, format, configuration, layer, organization, pixel data, resolution, scrollability, amount of available screen real estate, operating system, network bandwidth, service provider and user identity.

7. The computing device of claim 1, wherein the actions further comprise:
receiving information related to an update of electronic data related to a first tile within the set of tiles; and
updating, within a dashboard displayed on the first device, content displayed within the first tile based on the received information.

8. The computing device of claim 6, wherein the actions further comprise:
retrieving, from the database, second device dashboard information for the second device;
modifying a first tile based on the second device dashboard information; and
communicating information related to the modified first tile to the dashboard for display on the second device.

9. The computing device of claim 8, wherein said compiling a version further comprises:
creating a new version of the dashboard based on the determined display and rendering capabilities of the second device; and
storing said new version in association with the dashboard information.

10. The computing device of claim 9,
wherein said communicating information is based on said new version.

11. The computing device of claim 8, wherein said compiling a version further comprises:
modifying attributes of the stored received dashboard information based on the determined display and rendering capabilities of the second device; and
storing the modified attributes in said database in relation to the stored received dashboard information.

12. The computing device of claim 11,
wherein said communicating information is based on the dashboard information and stored modified attributes.

13. The computing device of claim 1, wherein the actions further comprise:
causing, over a network, a dashboard display on the first device and the dashboard display on the second device to operate as a collaborate environment, such that modifications on the first device are automatically caused to be performed on the second device, and modifications on the second device are automatically caused to be performed on the first device.

14. A computing device comprising:
one or more processors; and
a non-transitory computer-readable memory having stored therein computer-executable instructions, that when executed by the one or more processors, cause the one or more processors to perform actions comprising:
receiving, over a network, electronic data corresponding to an operation of a set of physical assets at a location, the electronic data compiled as tiles, such that each tile corresponds to an operation of an asset within said set of physical assets;
receiving dashboard information setting a configuration of a dashboard for a first device, the received dashboard information comprising information indicating how the tiles are to be displayed on a user interface (UI) of the first device;

storing, in a database associated with the computing device, the received dashboard information;

receiving, over a network, from a second device, a request to access and display the dashboard;

analyzing, based on said request, capability information of the second device, and based on said analysis, determining display and rendering capabilities of the second device;

modifying, in response to the second device request, the stored received dashboard information based on the determined display and rendering capabilities of the second device to obtain modified dashboard information, the modified dashboard information comprises data selected from a group consisting of: display size, color, dimension, font, layout, format, configuration, layer, organization, pixel data, resolution, scrollability, amount of available screen real estate, operating system, network bandwidth, service provider and user identity;

compiling a version of the dashboard for display on a display of the second device based on the modified dashboard information to obtain a compiled dashboard; and automatically causing, over the network, the compiled dashboard to be displayed on the display of the second device.

15. The computing device of claim 14, wherein the actions further comprise:
   retrieving, from the database, second device dashboard information for the second device;
   modifying a first tile based on the second device dashboard information; and
   communicating information related to the modified first tile to the dashboard for display on the second device.

16. The computing device of claim 15, wherein said compiling a version further comprises:
   creating a new version of the dashboard based on the determined display and rendering capabilities of the second device; and
   storing said new version in association with the dashboard information.

17. The computing device of claim 16,
   wherein said communicating information is based on said new version.

18. The computing device of claim 15, wherein said compiling a version further comprises:
   modifying attributes of the stored received dashboard information based on the determined display and rendering capabilities of the second device; and
   storing the modified attributes in said database in relation to the stored received dashboard information.

19. The computing device of claim 18,
   wherein said communicating information is based on the dashboard information and stored modified attributes.

* * * * *